No. 857,365. PATENTED JUNE 18, 1907.
C. R. SAUNDERS & A. B. BREITWEG.
GUARD FOR TIRES.
APPLICATION FILED DEC. 1, 1906.
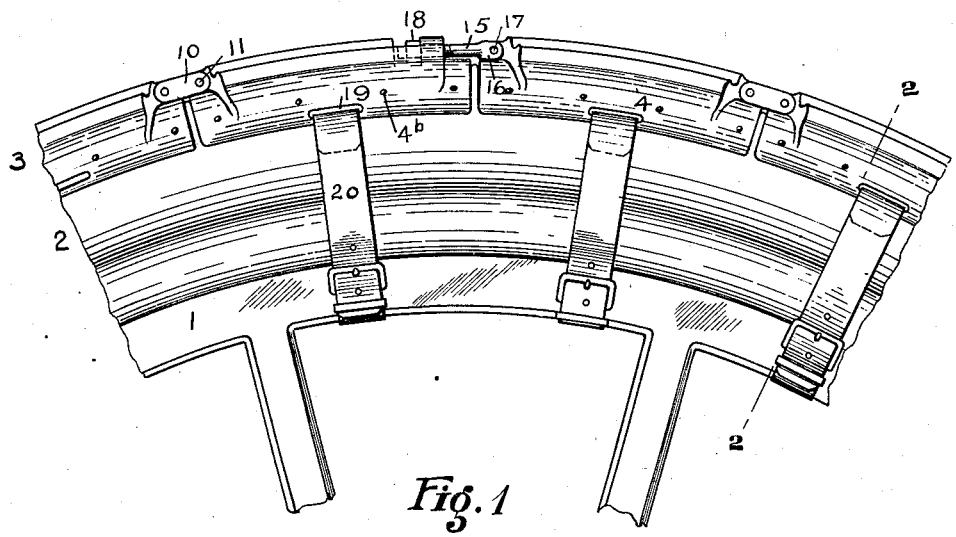
Fig. 1
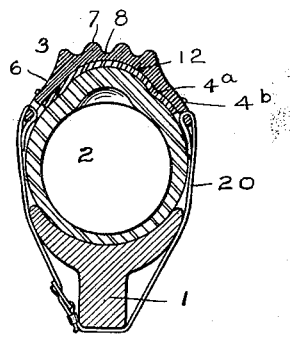
Fig. 5  Fig. 2  Fig. 3
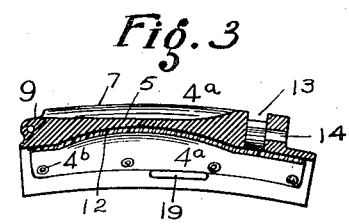
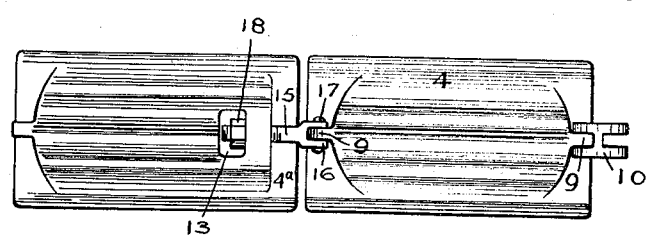
Fig. 4
WITNESSES:
Brennan B. West
Nathan F. Fretter
INVENTORS,
Charles R. Saunders and
Anton B. Breitweg
BY Bates, Fouts & Hull,
ATTY'S.

UNITED STATES PATENT OFFICE.

CHARLES R. SAUNDERS AND ANTON B. BREITWEG, OF CLEVELAND, OHIO.

GUARD FOR TIRES.

No. 857,365.　　　Specification of Letters Patent.　　　Patented June 18, 1907.

Application filed December 1, 1906. Serial No. 345,872.

*To all whom it may concern:*

Be it known that we, CHARLES R. SAUNDERS and ANTON B. BREITWEG, both citizens of the United States, and both residing at Cleveland, in the county of Cuyahoga and State of Ohio, have invented a certain new and useful Improvement in Guards for Tires, of which the following is a full, clear, and exact description, reference being had to the accompanying drawings.

Our invention relates to guards for protecting tires of vehicles, such as the pneumatic tires that are employed with automobiles, and has for its object to provide a device of this kind that may be readily applied to and removed from the tire; that will effectively prevent the same from puncture or side-slipping; that, while securing ample protection for the tire, shall be flexible; and that shall be so constructed as to afford an efficient drive between itself and the tire.

Generally speaking, the invention may be defined as consisting of the combinations of elements embodied in the claims hereto annexed.

Referring to the drawings, Figure 1 represents a side elevation of a portion of the felly and tire of a vehicle wheel, having our protecting device applied thereto. Fig. 2 represents a transverse section on the line 2—2 of Fig. 1. Fig. 3 represents a longitudinal sectional view through one of the elements or individual plates of our guard or protecting device. Fig. 4 represents a plan view showing the manner of connecting the ends of the protecting device. Fig. 5 represents a perspective view of one of the links by which the intermediate plates or elements are connected.

Describing the parts by reference characters, 1 represents the felly of a vehicle wheel. 2 represents a pneumatic tire carried thereby, said tire being of any ordinary type, a hose-pipe tire being shown for the purpose of illustration.

3 denotes our guard or protecting device, the same being shown in Figs. 1 and 2 as applied to the exterior surface of the tire. This protecting device is composed generally of a number of plates or elements 4, the same being joined by means of links to form a continuous articulated guard for the tire. All of the plates, with one exception, are of identical construction. Each plate, with the exception of the one to be described in detail hereinafter, comprises a body 5 which is generally convexo-concave in cross section, the concave inner surface of said body conforming generally to the contour of the tire with which the same is to be used and having extended integral side flanges 6 to engage a considerable portion of each side of the tire and to assist in preventing any side slipping of the guard with respect to the tire. The outer surface of each of the plates is provided with a series of longitudinal ribs 7 to prevent skidding. As will appear more particularly from Figs. 3 and 4, the bottom of the central depression 8 between the ribs 7 is substantially straight. The metal at the end of said central depression is elevated and is extended beyond the ribs to provide a lug at 9, and the lugs of the adjacent links and plates, with the exception of the one to be hereinafter noted, are joined by means of links 10. These links may be of ordinary construction, comprising a central body portion with side plates, said plates being adapted to embrace the lugs on adjoining elements or plates 3 and being united to said lugs, as by means of rivets 11.

The inner surface of each plate or element 4 is provided near the central portion thereof with a concavity 12, the curvature of which, both longitudinally and transversely, is greater than the corresponding curvature of the tire. The ends of each plate are of substantially the same curvature, longitudinally and transversely, as the surface of the tire. The object of this construction is to cause the tire, under compression, to bulge into this concavity and form a gripping surface between the same and the plates, whereby the tendency of the guard to slip on the tire is largely, if not entirely, prevented.

As the friction between the tire and the plates or blocks may blister or otherwise injure the tire, we provide for each plate or block a lining of rubber or similar material. This lining, represented at 4ª, may be secured in place by means of rivets 4ᵇ extending through the same and the side flanges of the plates or blocks.

In order to connect the ends of the complete guard, we alter the construction of one of the end plates 4ª in the following manner. Near one end and in the central portion of the elevated portion of said plate, we provide a recess 13, the material adjacent the end of such elevated portion constituting a cross bar and being provided with a bore or perforation 14 for the reception of the bolt 15, (see Fig. 3). This bolt is provided at one end with a yoke 16 adapted to embrace the lug 9 of the adjacent plate and being secured to said lug in any suitable manner, as by a rivet 17. In applying the guard or protecting device to the tire, the bolt 15 is inserted through the bore 14 and a nut 18 is applied to the end thereof. This provides a very effective manner of securing the ends of the guard together and protects the nut from contact with the surface on which the vehicle is being driven.

While the side flanges 6 will ordinarily be ample to prevent the guard from slipping sidewise on the tire and while the provision of the recesses 12 will ordinarily prevent any tendency of the guard to creep on the tire, as a further precaution we may provide each side flange with one or more slots 19 for the reception of straps 20, said straps passing around the felly, inside the same, and being buckled, as shown in Fig. 1.

The individual plates or blocks of the guard may be made of any desired material which is capable of withstanding the usage to which it is subjected. While steel or aluminium are admirably adapted for this purpose, we do not propose to be limited to these specific materials.

Having thus described our invention, we claim:

1. A guard for vehicle tires comprising a plurality of plates or members flexibly connected, and means for connecting the ends of said guard, said means comprising a bolt pivotally connected to one of the end plates or members, a cross bar on the other end plate or member, said cross bar being provided with an aperture for the reception of the end of the bolt, and a nut on said bolt.

2. A guard for vehicle tires comprising a plurality of plates or members flexibly connected, means for connecting the ends of said guard, said means comprising a lug on one of the end plates or members, a bolt pivoted to said lug, the other end plate or member being provided with a recess for the reception of the end of the bolt, and an adjusting nut in said recess engaging the end of said bolt.

3. A tire guard for vehicle wheels comprising a plurality of plates or members flexibly connected, each of said plates or members having end portions conforming substantially in curvature to the curvature of the tire and having intermediate of the end portions a recess or cavity, said recess or cavity extending from end portion to end portion of said plate.

4. A tire guard for vehicle tires comprising a plurality of plates or members flexibly connected, each of said plates or members being provided at opposite ends thereof with surfaces of substantially the same contour as the normal contour of the tire and with a concavity intermediate of said surfaces and extending longitudinally therebetween the curvature of said cavity being greater than that of said surfaces.

5. A guard for vehicle tires comprising a plurality of plates or members flexibly connected, each being provided with curved end portions and with a longitudinally extending cavity intermediate said portions the curvature whereof is greater than that of said end portions.

6. A guard for vehicle tires comprising a plurality of plates or members, each of said members being provided with a recess adjacent the end thereof, means located in said recesses for flexibly connecting said plates or members, each of said plates or members being provided with side flanges and each of said plates or members being provided on the interior thereof with curved surfaces adapted to engage the tire and with an outwardly projecting longitudinally extending concavity.

7. A tire guard for vehicle wheels comprising a plurality of plates or members flexibly connected together, each of said plates being provided with side flanges conforming to the contour of the tire, said flanges being provided with apertures for the reception of fastening means for securing the same to the rim or felly, and each of said plates or members being provided with tire-engaging portions and a longitudinally extending cavity intermediate of said portions.

8. A protecting plate or member for the purpose specified having curved end portions and a longitudinally extending cavity intermediate of said portions and of greater curvature than said end portions, and a lining for said cavity.

9. A guard for vehicle tires comprising a plurality of plates or members flexibly connected, each of said plates or members being provided with surfaces of substantially the same contour as the normal contour of the tire and with a longitudinally extending concavity intermediate of said surfaces the curvature of which is greater than that of said surfaces, and a lining for each of said concavities.

10. A protecting plate or member for the purpose specified having side flanges and end portions of substantially the same curvature as the normal curvature of the tire and a longitudinally extending cavity intermediate of said end portions and of greater curvature than said portions, a lining for said plate or member, and means for securing the same to said flanges.

11. A guard for vehicle tires comprising a plurality of plates or members flexibly connected, each of said plates or members being provided with bearing surfaces of substantially the same contour as the normal contour of the tire and with a concavity extending longitudinally of said plate and of greater curvature than the normal curvature of the tire, and a protecting lining interposed between said bearing surfaces and the adjacent surface of the tire.

12. A protecting plate or member for the purpose specified having side flanges, each of said flanges being provided with an aperture near the inner end thereof, a lining for said plate or member, said lining having portions extending between the said flanges and the tire to which the said plate or member is applied, and a strap for securing said plate or member to the tire, said strap extending through the apertures in the flanges and the lining.

In testimony whereof, we hereunto affix our signatures in the presence of two witnesses.

CHARLES R. SAUNDERS.
ANTON B. BREITWEG.

Witnesses:
J. B. HULL,
GERTRUDE CAULKIN.